(12) United States Patent
Preston (10) Patent No.: US 9,868,383 B2
(45) Date of Patent: Jan. 16, 2018

(54) RETENTION DEVICE FOR RESTRAINING AN ARTICLE DURING TRANSPORT OF THE ARTICLE

(71) Applicant: CDCE Engineered Solutions, Inc., Yorba Linda, CA (US)

(72) Inventor: Paul Preston, Corona Del Mar, CA (US)

(73) Assignee: CDCE Engineered Solutions, Inc., Yorba Linda, CA (US)

( * ) Notice: Subject to any disclaimer, the term of this patent is extended or adjusted under 35 U.S.C. 154(b) by 0 days.

(21) Appl. No.: 15/171,145

(22) Filed: Jun. 2, 2016

(65) Prior Publication Data

US 2017/0349085 A1    Dec. 7, 2017

(51) Int. Cl.
*B60P 7/08* (2006.01)
*B60P 7/135* (2006.01)

(52) U.S. Cl.
CPC ............ *B60P 7/135* (2013.01); *B60P 7/0892* (2013.01)

(58) Field of Classification Search
CPC ............................... B60P 7/135; B60P 7/0892
USPC ............... 410/30, 90, 91, 94, 95, 121, 153; 248/351; 249/219.1, 2, 3
See application file for complete search history.

(56) References Cited

U.S. PATENT DOCUMENTS

| | | | |
|---|---|---|---|
| 1,953,303 A | | 4/1934 | Kohlmann |
| 2,461,767 A | * | 2/1949 | Peyton ................. B61D 45/001 410/121 |
| 2,812,728 A | * | 11/1957 | Reheis ................. B61D 45/001 410/121 |

(Continued)

FOREIGN PATENT DOCUMENTS

| | | |
|---|---|---|
| DE | 3635563 A1 | 4/1988 |
| WO | 8403260 A1 | 8/1984 |
| WO | 9220592 A1 | 11/1992 |

OTHER PUBLICATIONS

PS Packing, "3-⅜" ×5" × .055" IPS Anti-Skid Plate 200/cs", http://www.ipack.com/38-055-ips-anti-skid-plate-200cs-p-626370.html?osCsid=m1ekk748mcsgd765dag5qrp7s0, pp. 1-4, date retrieved by Applicant Jun. 1, 2016 (date of original publication unknown).

(Continued)

*Primary Examiner* — Stephen Gordon (57) ABSTRACT

A retention device for physically restraining undesired movement of an article during transport of the article. Retention devices may include a first surface, a first set of protrusions extending outward from the first surface, a second surface, and a second set of protrusions extending outward from the second surface. Each protrusion in the first set of protrusions may be shaped to engage a floor of a transport vehicle. Each protrusion in the second set of protrusions may be shaped to engage an article positioned in the transport vehicle. The first surface and the second surface may be aligned along different planes at an angular offset. During transport of an article, the first set of protrusions engage with a floor of the transport vehicle, and the second set of protrusions engage with the article. After the transport vehicle has arrived at its destination, the retention device can be released from engaging the floor and the article by lifting the article, as typically occurs when a forklift is used to unload the article from the transport vehicle.

18 Claims, 11 Drawing Sheets

(56) References Cited

U.S. PATENT DOCUMENTS

| | | | |
|---|---|---|---|
| 4,078,673 A | 3/1978 | Wilhelmi | |
| 4,194,330 A | 3/1980 | Smith | |
| 4,311,420 A | 1/1982 | Hendricks | |
| 5,662,305 A | 9/1997 | Shimamura | |
| 6,244,802 B1 | 6/2001 | Stanesic | |
| 6,511,270 B1 | 1/2003 | Burke | |
| 6,702,532 B1 | 3/2004 | Throener | |
| 7,828,263 B2 * | 11/2010 | Bennett | E04G 13/00 249/2 |
| 8,875,468 B2 * | 11/2014 | Dhinjan | E04F 13/06 52/255 |

OTHER PUBLICATIONS

Form PCT/ISA/220, PCT/US17/23662, "Notification of Transmittal of the International Search Report and the Written Opinion of the International Searching Authority, or the Declaration", 1 page(s); Form PCT/ISA/210, PCT/US17/23662, "International Search Report", 2 page(s); Form PCT/ISA/237, PCT/US17/23662, "Written Opinion of the International Searching Authority", 8 page(s); dated Jun. 16, 2017.

PCT Recordation of Search History, PCT/US17/23662, 7 page(s). Included with Cite No. 1 above. Dated Jun. 16, 2017.

* cited by examiner

Retention Device 100

FIG. 1

Retention Device 100
(Front View)
FIG. 2

Retention Device 100
(Back View)
FIG. 3

Retention Device 100
(Right View)
FIG. 4

Retention Device 100
(Left View)
FIG. 5

Retention Device 100
(Top View)
FIG. 6

Retention Device 100
(Bottom View)
FIG. 7

Retention Device 800

Retention Device 800
(Right View)
FIG. 11

Retention Device 800
(Left View)
FIG. 12

Retention Device 800
(Top View)
FIG. 13

Retention Device 800
(Bottom View)
FIG. 14

RETENTION DEVICE FOR RESTRAINING AN ARTICLE DURING TRANSPORT OF THE ARTICLE

FIELD

This disclosure relates to devices for securing cargo, and more particularly, to a retention device for physically restraining undesired movement of an article during transport of the article.

BACKGROUND

Modern commerce requires transportation of goods from one location to another. Transportation of goods can be accomplished using various approaches. One common approach involves packaging goods onto pallets, loading pallets onto transport vehicles (e.g., motorized vehicles or trailers attached thereto), driving the transport vehicles to a destination, and then unloading the pallets from the transport vehicles. Unfortunately, the goods on the pallets are often damaged when neighboring pallets move into each other during transit, resulting in great economic loss for the goods provider and/or the transport vehicle operator.

Several attempts have been made to solve the problem of moving pallets. One approach involves chaining the pallets in place on the transport vehicle. While this approach can work for certain transport vehicles (e.g., flatbed trucks or trailers), it is often not available on other transport vehicles (e.g., enclosed beds or trailers).

Other approaches require specialized flooring that is costly to install compared to standard wood floors. For example, U.S. Pat. No. 4,194,330 to Smith (granted Mar. 25, 1980) describes a steel floor for freight hauling vehicles that includes anti-skid projections, and U.S. Pat. No. 4,311,420 to Hendricks (granted Jan. 19, 1982) describes a channeled cargo-supporting floor and a snubbing device releasably engaging the floor channels and projecting upwardly to block movement of cargo. The relatively high cost for specialized floors has precluded wide adoption of such approaches.

Anti-skid plates are sometimes used between the bottom of a pallet and the floor of a transport vehicle, but the plates have disadvantages. For instance, the anti-skid plates cannot be efficiently removed after they attach to the pallets or to the floor. Anti-skid plates that remain attached to the floors of transport vehicles can destroy wheels of forklifts that are used to remove pallets from the transport vehicles. When the anti-skid plates remain attached to the pallet, those plates can destroy floors to which the pallets are moved after being unloaded from the transport vehicles. In some cases, the plates can unexpectedly fall from the pallets during forklift transport, and individuals can later injure themselves by stepping on the fallen plates. One additional disadvantage of the anti-skid plates is their life cycle. Plates that attach to the pallets or the floors cannot be reused.

The above approaches have had limited commercial success, mainly because none of the approaches can be efficiently used for enclosed transport vehicles, which are widely available. Removal of the restraining devices for each approach can also be time-consuming since removing the restraining devices often requires extra steps beyond simply unloading the pallets. The transport industry still seeks efficient and cost-effective solution to the problem of securing pallets so as to prevent damage to goods during transport. Clearly, devices that solve the above problems are needed.

SUMMARY

Embodiments of this disclosure relate generally to retention devices for physically restraining undesired movement of an article during transport of the article. Such retention devices may include a first surface, a first set of protrusions extending outward from the first surface, a second surface, and a second set of protrusions extending outward from the second surface. Each protrusion in the first set of protrusions may be shaped to engage a floor of a transport vehicle. Each protrusion in the second set of protrusions may be shaped to engage an article (e.g., a pallet) positioned in the transport vehicle. During transport of the article, the first set of protrusions engage with the floor of the transport vehicle, and the second set of protrusions engage with the article. After the transport vehicle has arrived at its destination, the retention device can be released from engaging the floor and the article by lifting the article, as typically occurs when a forklift is used to unload the article from the transport vehicle. Thus, removal of the retention device requires less effort than other restraining devices.

Details of embodiments are set forth in the drawings and the description below.

BRIEF DESCRIPTION OF THE DRAWINGS

Like reference numbers and designations in the drawings indicate like elements.

DETAILED DESCRIPTION

Figure 1:
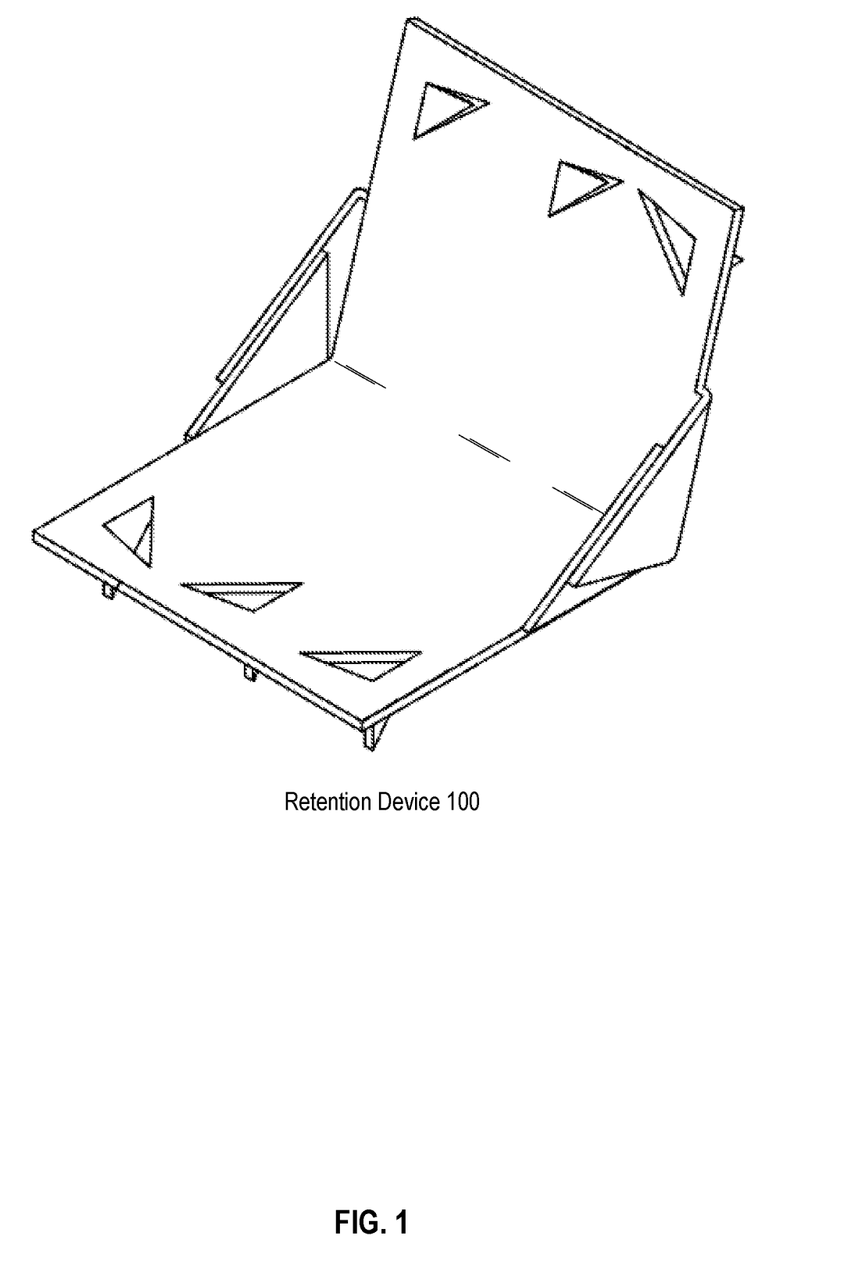
FIG. 1 depicts a perspective view of a first retention device for physically restraining undesired movement of an article during transport of the article.
Figure 2:
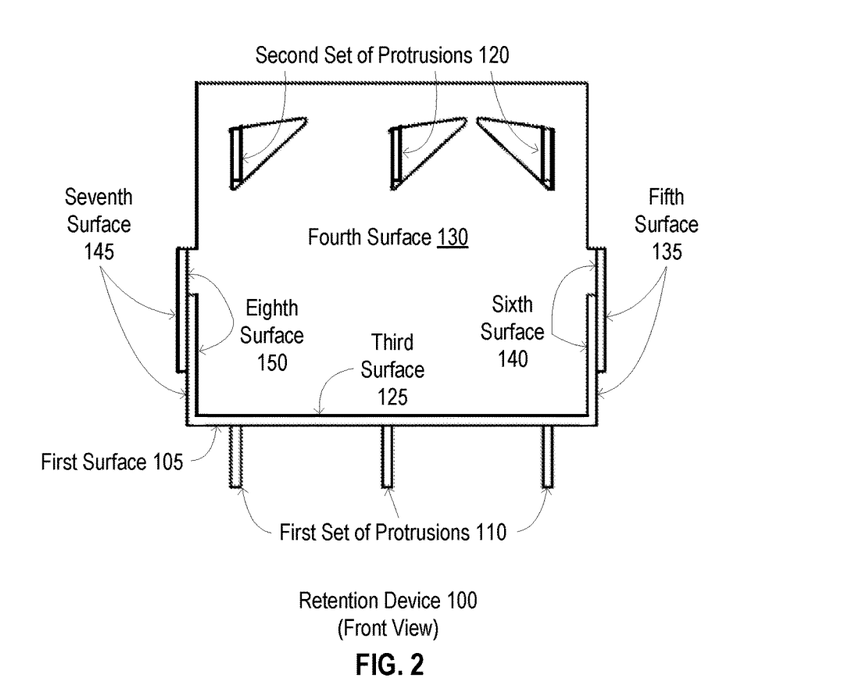
FIG. 2 through FIG. 7 respectively depict front, back, right, left, top, and bottom views of the first retention device.
Figure 3:
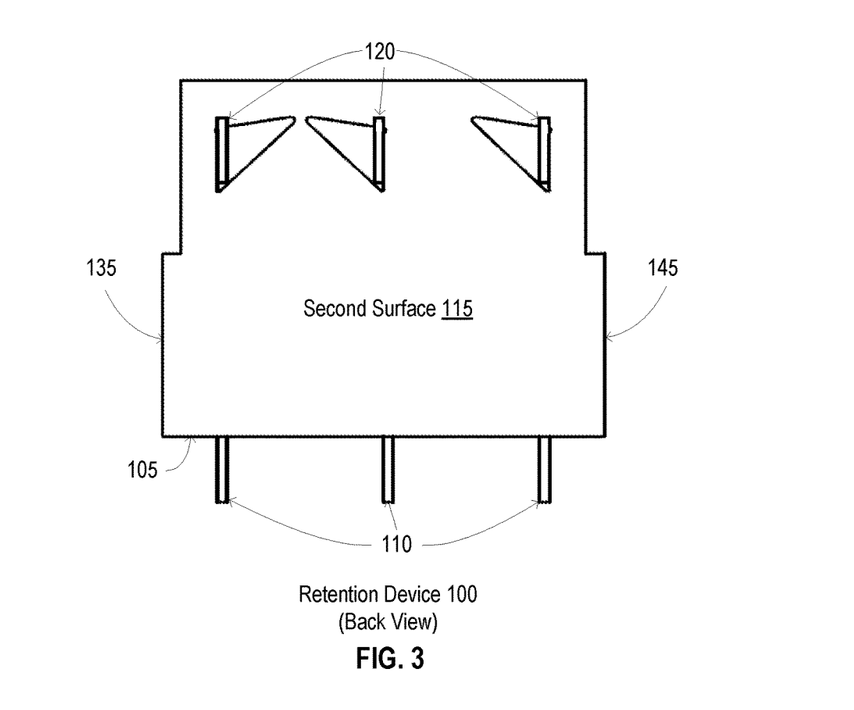

FIG. 1 depicts a perspective view of a first retention device 100. The retention device 100 is used for physically restraining undesired movement of an article during transport of the article. FIG. 2 through FIG. 7 respectively depict front, back, right, left, top, and bottom views of the retention device 100.

As shown in FIG. 1 through FIG. 7, the retention device 100 includes a first surface 105 and a first set of protrusions 110 extending outward from the first surface 105. The first set of protrusions 110 can include any number of protrusions. The retention device 100 also includes a second surface 115 and a second set of protrusions 120 extending outward from the second surface 115. The second set protrusions 120 can include any number of protrusions.

By way of example, three protrusions are shown in each of the first set of protrusions 110 and the second set of protrusions 120. The pattern of each set of protrusions is a row. However any pattern is contemplated. Each protrusion in the first set of protrusions 110 is shaped to engage a floor of a transport vehicle (not shown). Each protrusion in the second set of protrusions 120 is shaped to engage an article (not shown) positioned in the transport vehicle. The each shape includes a pointed end that inserts into the floor or the article.

Figure 4:
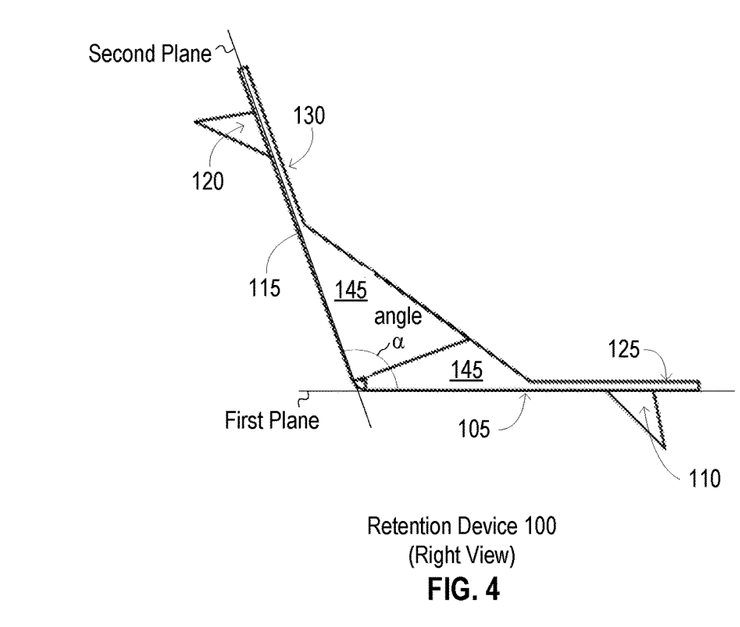
Figure 5:
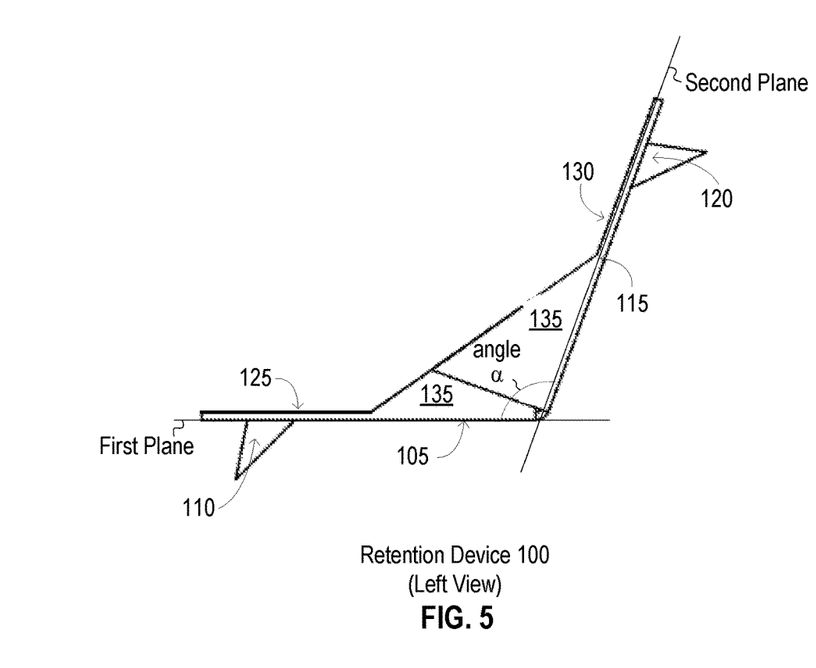
Figure 6:
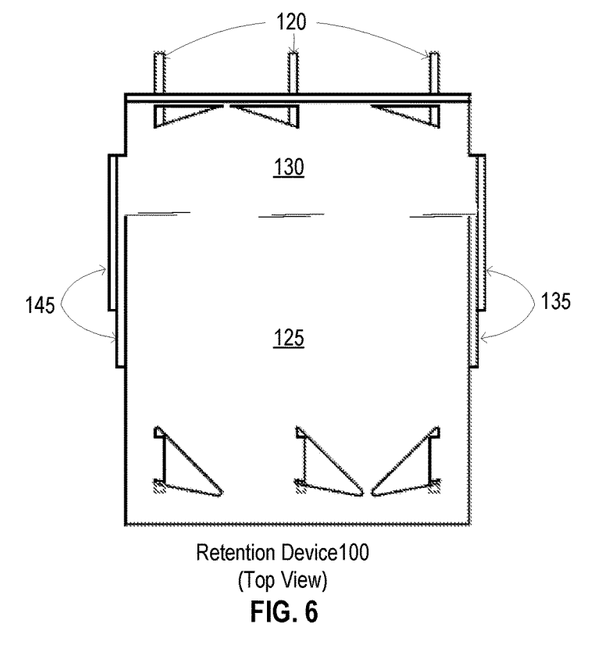
Figure 7:
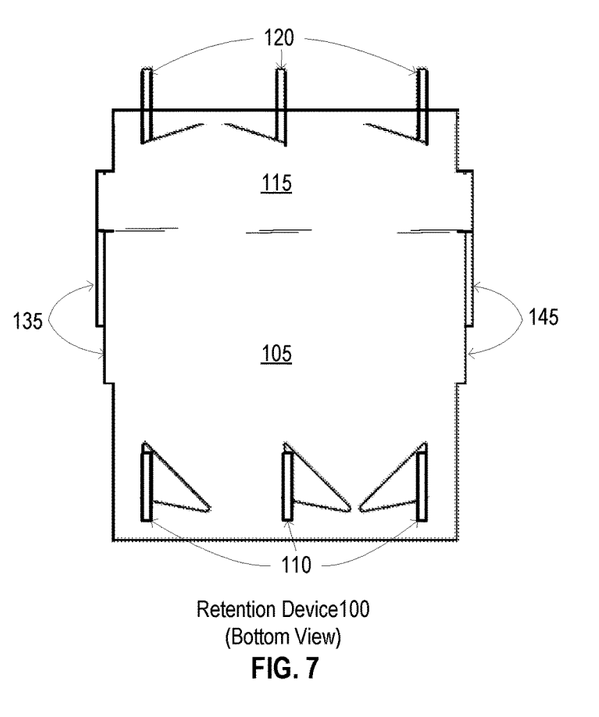

As illustrated by FIG. 4 and FIG. 5, the first surface 105 extends along a first plane, and the second surface 115 extends along a second plane. A first edge of the first surface 105 and a first edge of the second surface 115 are joined together at or near where the first and second planes intersect. The first plane and the second plane are separated by an angle α>0° such that the first surface 105 and the second surface 115 are not parallel to each other. By way of example, the figures show the angle α to be ≥90° and ≤135°. Other embodiments may use smaller angles, including angles ≥0° and ≤90°. Other embodiments may use larger angles, including angles ≥135° and ≤180°.

The retention device 100 includes other surfaces. As shown, a third surface 125 extends parallel to the first plane, and a fourth surface 130 extends parallel to the second plane. The retention device 100 also includes a fifth surface 135, a sixth surface 140, a seventh surface 145, and an eighth surface 150. Corresponding edges of the first surface 105 and the second surface 115 are joined with corresponding edges of the fifth surface 135, and also with corresponding edges of the seventh surface 145. Corresponding edges of the third surface 125 and the fourth surface 130 are joined with corresponding edges of the sixth surface 140, and also with corresponding edges of the eighth surface 150.

As will be shown later in FIG. 15A through FIG. 15C, the retention device 100 can be used to physically restrain undesired movement of an article (e.g. a pallet) during transport of the article in a transport vehicle.

Figure 8:
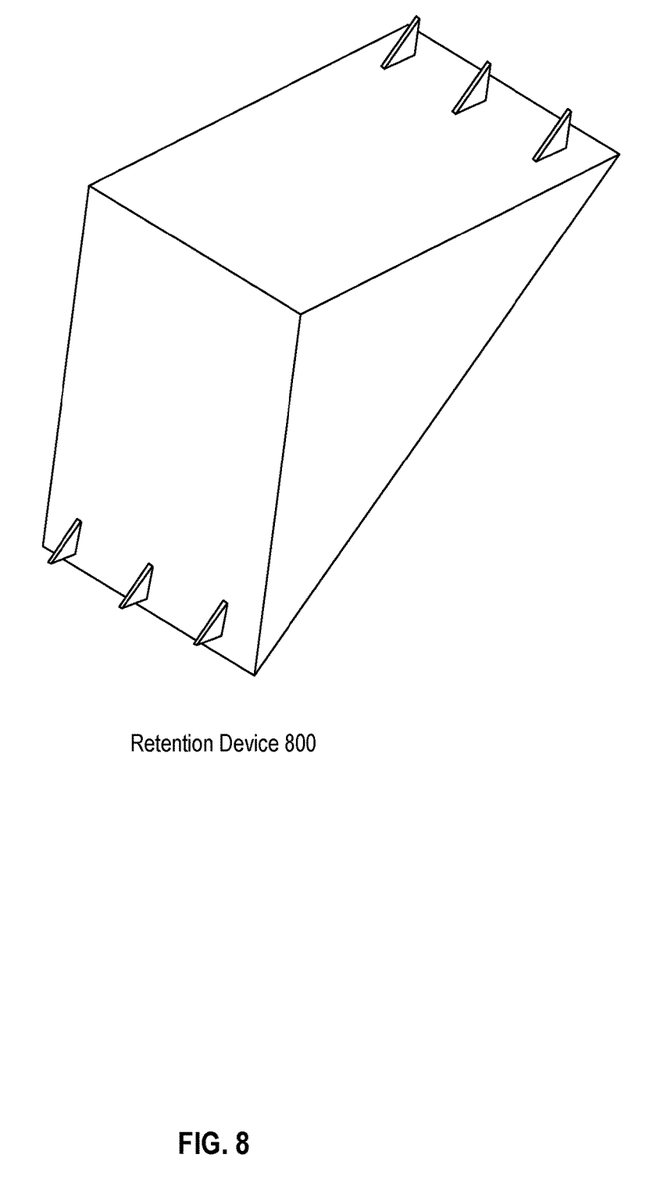
FIG. 8 depicts a perspective view of a second retention device for physically restraining undesired movement of an article during transport of the article.
Figure 9:
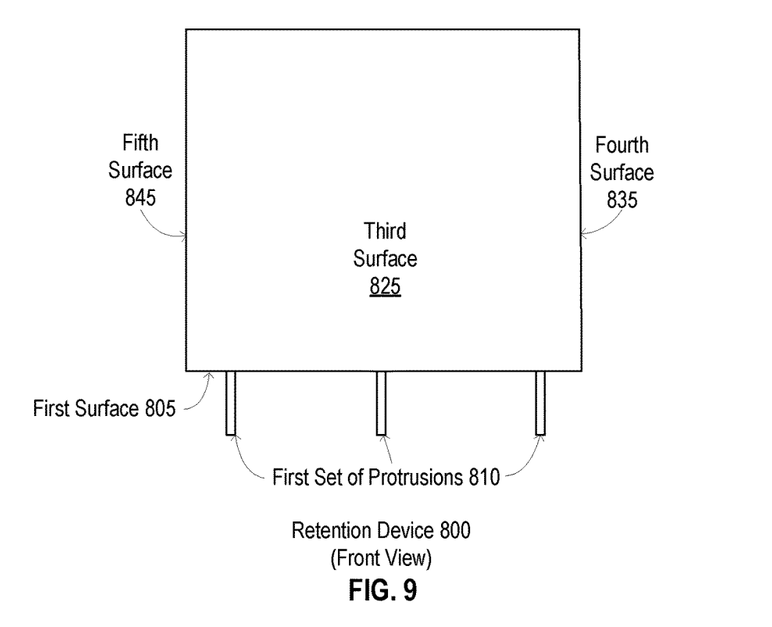
FIG. 9 through FIG. 14 respectively depict front, back, right, left, top, and bottom views of the second retention device.
Figure 10:
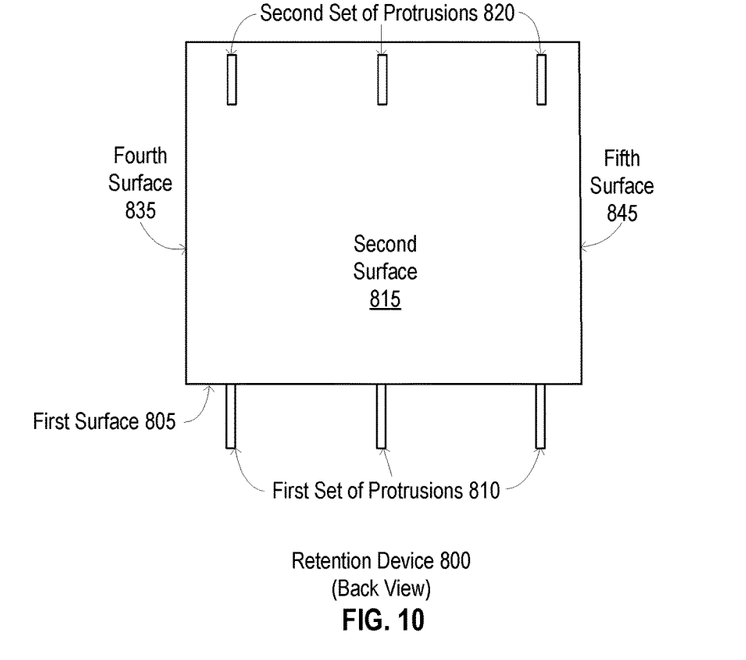
Figure 11:
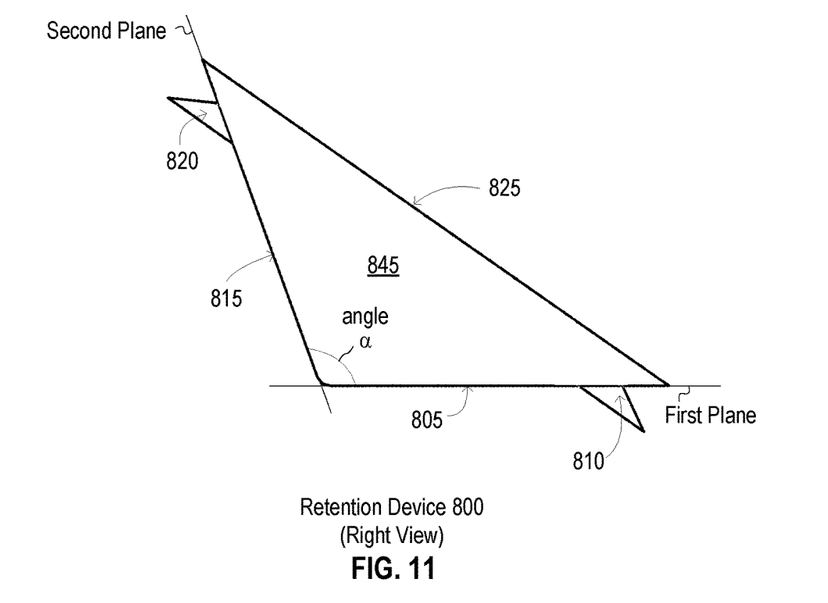
Figure 12:
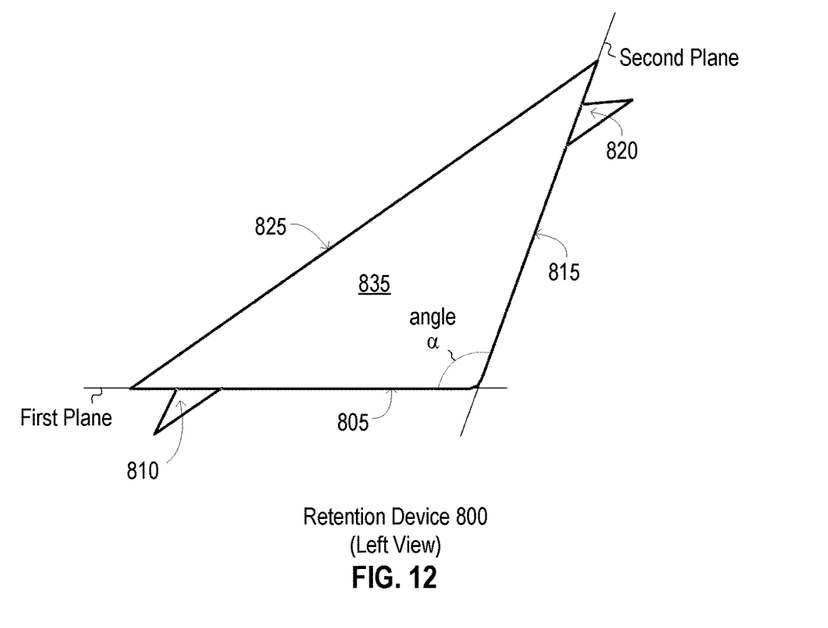
Figure 13:
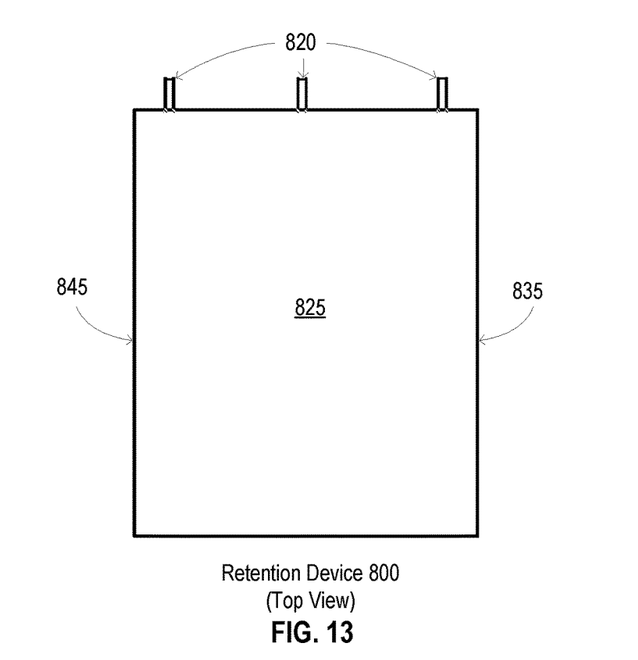
Figure 14:
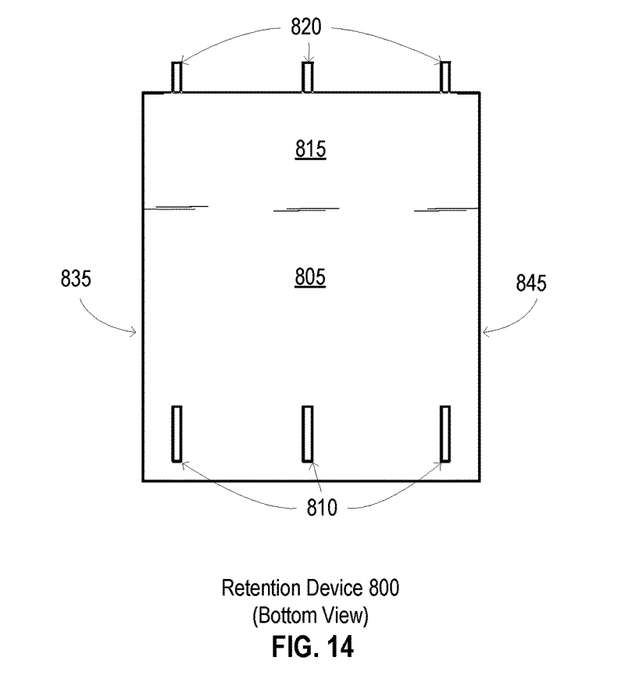

FIG. 8 depicts a perspective view of a second retention device 800 for physically restraining undesired movement of an article during transport of the article. FIG. 9 through FIG. 14 respectively depict front, back, right, left, top, and bottom views of the retention device 800.

As shown in FIG. 8 through FIG. 14, the retention device 800 includes a first surface 805 and a first set of protrusions 810 extending outward from the first surface 805. The first set of protrusions 810 can include any number of protrusions. The retention device 800 also includes a second surface 815 and a second set of protrusions 820 extending outward from the second surface 815. The second set protrusions 820 can include any number of protrusions.

By way of example, three protrusions are shown in each of the first set of protrusions 810 and the second set of protrusions 820. Each protrusion in the first set of protrusions 810 is shaped to engage a floor of a transport vehicle (not shown). Each protrusion in the second set of protrusions 820 is shaped to engage an article (not shown) positioned in the transport vehicle.

The first surface 805 is shown to extend along a first plane. The second surface 815 is shown to extend along a second plane. The first plane and the second plane are separated by an angle α.

The retention device 800 includes other surfaces, including a third surface 825. As shown, corresponding edges of the first surface 805 and the second surface 815 are joined together, corresponding edges of the first surface 805 and the third surface 825 are joined together, and corresponding edges of the second surface 815 and the third surface 825 are joined together to form a triangle.

A fourth surface 835 and a fifth surface 845 are also included. Edges of the first surface 805, the second surface 815 and the third surface 825 are joined together with corresponding edges of the fourth surface 835. Edges of the first surface 805, the second surface 815 and the third surface 825 are joined together with corresponding edges of the fifth surface 845.

As will be shown later in FIG. 16A through FIG. 16C, the retention device 800 can be used to physically restrain undesired movement of an article (e.g. a pallet) during transport of the article in a transport vehicle.

Methods of Use

Figure 15A:
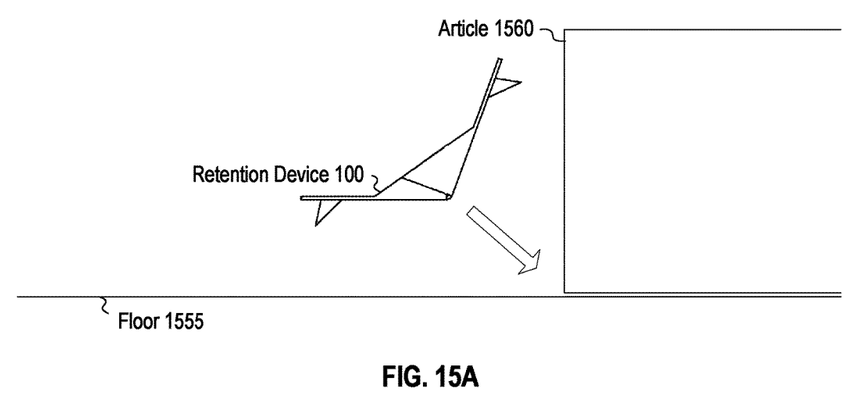
FIG. 15A depicts a position of the first retention device relative to a floor of a transportation vehicle and an article before protrusions of the first retention device engage the floor and the article.
Figure 15B:
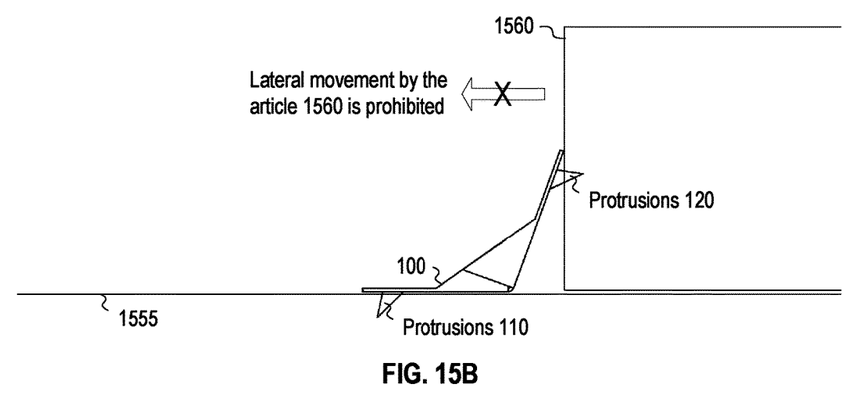
FIG. 15B depicts a position of the first retention device relative to a floor of a transportation vehicle and an article after protrusions of the first retention device engage the floor and the article.
Figure 15C:
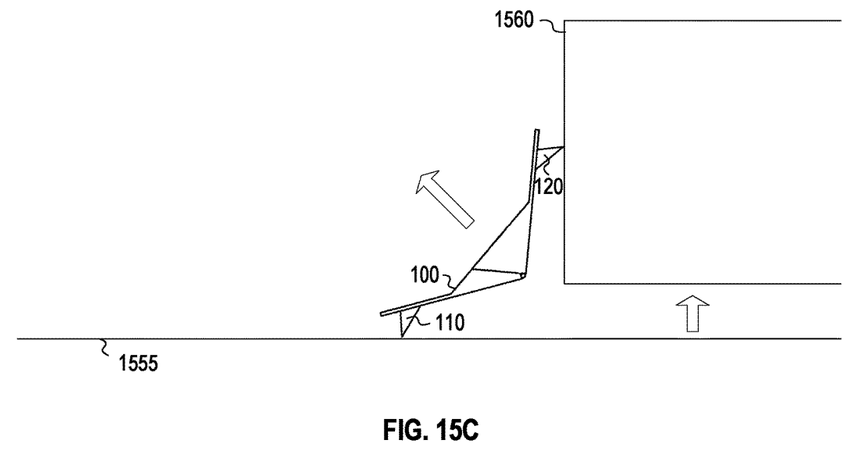
FIG. 15C depicts a position of the first retention device relative to a floor of a transportation vehicle and an article after the article is lifted to disengage protrusions of the first retention device from the floor and the article.

FIG. 15A, FIG. 15B and FIG. 15C depict different positions of the retention device 100 and its protrusions 110 and 120 relative to a floor 1555 of a transportation vehicle and an article 1560 at different times during use of the retention device 100.

FIG. 15A depicts a position of the retention device 100 relative to the floor 1555 and the article 1560 before the protrusions 110 and 120 of the retention device 100 engage the floor 1555 and the article 1560. As shown, the retention device 100 is moved towards the floor 1555 and the article 1560.

FIG. 15B depicts a second position of the retention device 100 relative to the floor 1555 and the article 1560 after the protrusions 110 and 120 of the retention device 100 engage the floor 1555 and the article 1560 to physically restrain undesired movement of the article 1560. As shown, the protrusions 110 of the retention device 100 engage with the floor 1555, and the protrusions 120 of the retention device 100 engage with the article 1560. Once the protrusions 110 and 120 of the retention device 100 are engaged with the floor 1555 and the article 1560, lateral movement by the article 1560 is prohibited.

FIG. 15C depicts a third position of the retention device 100 relative to the floor 1555 and the article 1560 after the article 1560 is lifted to disengage the protrusions 110 and 120 of the retention device 100 from the floor 1555 and the article 1560. As shown, the article 1560 is lifted, which disengages the protrusions 110 and the floor 1555, and also disengages the protrusions 120 and the article 1560.

Figure 16A:
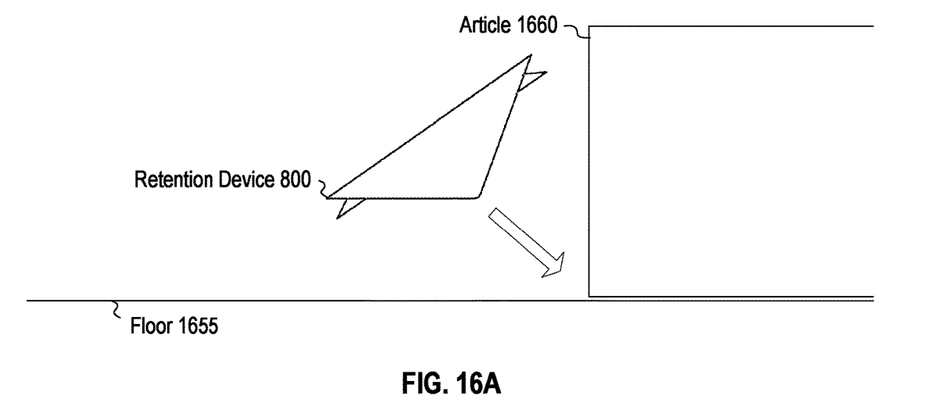
FIG. 16A depicts a position of the second retention device relative to a floor of a transportation vehicle and an article before protrusions of the second retention device engage the floor and the article.
Figure 16B:
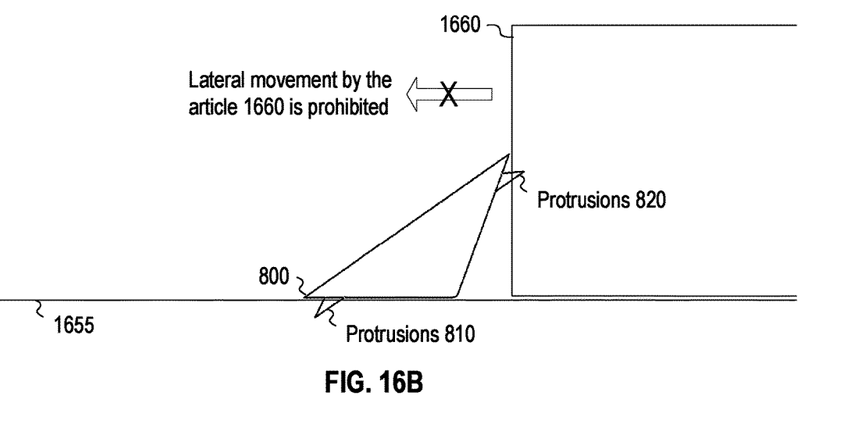
FIG. 16B depicts a position of the second retention device relative to a floor of a transportation vehicle and an article after protrusions of the second retention device engage the floor and the article.
Figure 16C:
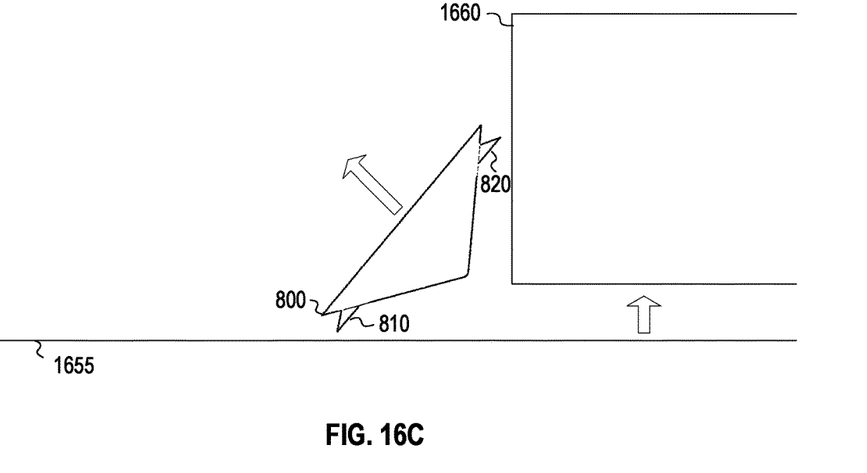
FIG. 16C depicts a position of the second retention device relative to a floor of a transportation vehicle and an article after the article is lifted to disengage protrusions of the second retention device from the floor and the article.

FIG. 16A, FIG. 16B and FIG. 16C depict different positions of the retention device 800 and its protrusions 810 and 820 relative to a floor 1655 of a transportation vehicle and an article 1665 at different times during use of the retention device 800.

FIG. 16A depicts a position of the retention device 800 relative to the floor 1655 and the article 1660 before the protrusions 810 and 820 of the retention device 800 engage the floor 1655 and the article 1660. As shown, the retention device 800 is moved towards the floor 1655 and the article 1660.

FIG. 16B depicts a second position of the retention device 800 relative to the floor 1655 and the article 1660 after the protrusions 810 and 820 of the retention device 800 engage the floor 1655 and the article 1660 to physically restrain undesired movement of the article 1660. As shown, the protrusions 810 of the retention device 800 engage with the floor 1655, and the protrusions 820 of the retention device 800 engage with the article 1660. Once the protrusions 810 and 820 of the retention device 800 are engaged with the floor 1655 and the article 1660, lateral movement by the article 1660 is prohibited.

FIG. 16C depicts a third position of the retention device 800 relative to the floor 1655 and the article 1660 after the article 1660 is lifted to disengage the protrusions 810 and 820 of the retention device 800 from the floor 1655 and the article 1660. As shown, the article 1660 is lifted, which disengages the protrusions 810 and the floor 1655, and also disengages the protrusions 820 and the article 1660.

During some uses of the retention devices 100/800, the protrusions 120/820 are not inserted into the article 1560/1660. Instead, the protrusions 120/820 or the second surface 115/815 may come in contact with the article 1560/1660.

Variations of Design

The embodiments described above are merely examples. It is to be understood that alternative features can be used in different embodiments.

For example, the protrusions can have different shapes that are suitable for engaging with the floor and the article, including: cones; pegs with pointed tops; spikes; pyramids; barbs; cleats; teeth; claws; and others. Different heights of the protrusions are contemplated. Any number of protrusions can be used. Different patterns of protrusions other than rows can be used, including: columns; grids; letters and symbols (e.g., T, X, /, + and all others); and others. The protrusions can be integrally formed with the corresponding surfaces of the retention device, attached to those surfaces, or inserted through those surfaces. The height of each protrusion can be relative to dimensions of the surface from which it extends—e.g. in one embodiment, the height of each protrusion is less than one-fourth of a width of the respective surface and less than one-forth a length of the respective surface.

Different gripping means other than protrusions are contemplated, including fasteners (e.g. nails, screws, bolts, pegs and holes, others), adhesives, and other gripping means for engaging a retention device and a floor or an article.

Method of Manufacture

Figure 17A:
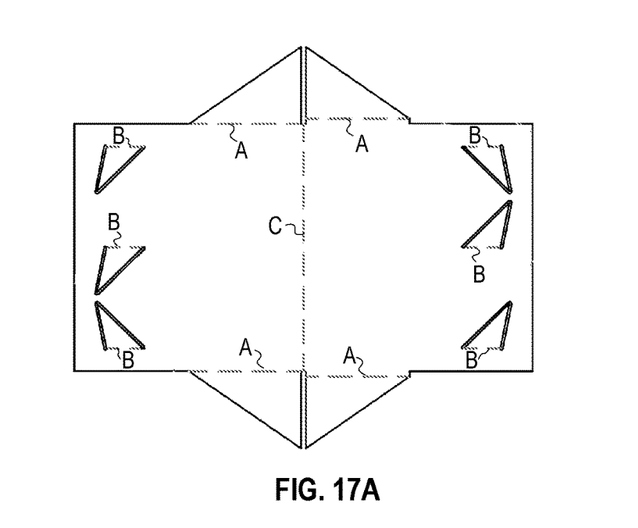
FIG. 17A through FIG. 17C depict a method of manufacturing the first retention device.
Figure 17B:
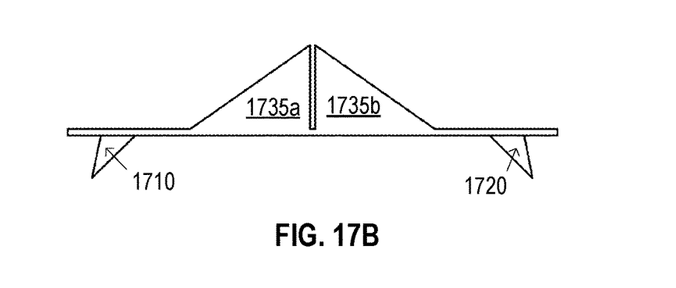
Figure 17C:
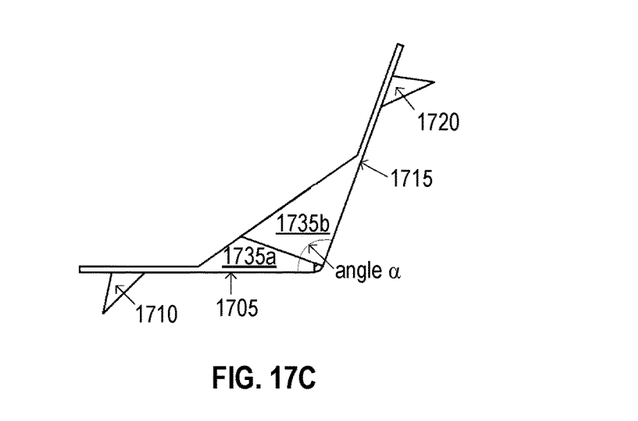

FIG. 17A through FIG. 17C depict a method of manufacturing a retention device. As shown, folding occurs along dotted lines A to create surface 1735 (comprising portions 1735a and 1735b). Folding occurs along dotted lines B to create protrusions 1710 and 1720. Folding occurs along dotted line C to move a first side 1705 and a second side 1715 so they are separated by an angle α.

Of course, other methods of manufacturing are available, including injection molding and any other known methods. Also, in different embodiments, the following materials may be used to form that embodiment's retention device: plastics; metals; woods; and others.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

The invention claimed is:

1. A retention device for physically restraining undesired movement of an article during transport of the article, the device comprising:
    a first surface extending along a first plane;
    a first set of protrusions extending outward from the first surface, wherein each protrusion in the first set of protrusions is shaped to engage a floor of a transport vehicle, and wherein each protrusion in the first set of protrusions is integrally formed with the first surface;
    a second surface extending along a second plane;
    a second set of protrusions extending outward from the second surface, wherein each protrusion in the second set of protrusions is shaped to engage an article positioned in the transport vehicle, and wherein each protrusion in the second set of protrusions is integrally formed with the second surface,
    wherein the first plane and the second plane are separated by an angle that is greater than 0 degrees;
    a third surface extending parallel to the first plane;
    a fourth surface extending parallel to the second plane;
    a fifth surface;
    a sixth surface;
    a seventh surface; and
    an eighth surface,
    wherein corresponding edges of the first and second surfaces are joined together, corresponding edges of the first and fifth surfaces are joined together, corresponding edges of the second and fifth surfaces are joined together, corresponding edges of the first and seventh surfaces are joined together, and corresponding edges of the second and seventh surfaces are joined together.

2. The retention device of claim 1, wherein the article is a pallet, wherein the floor is a wood floor, and wherein the transport vehicle is a motorized vehicle, a trailer, a shipping container, or a railroad car.

3. The retention device of claim 1, wherein a first edge of the first surface and a first edge of the second surface are joined together.

4. A retention device for physically restraining undesired movement of an article during transport of the article, the device comprising:
    a first surface extending along a first plane;
    a first set of protrusions extending outward from the first surface, wherein each protrusion in the first set of protrusions is shaped to engage a floor of a transport vehicle;

a second surface extending along a second plane;
a second set of protrusions extending outward from the second surface, wherein each protrusion in the second set of protrusions is shaped to engage an article positioned in the transport vehicle; and
one or more other surfaces,
wherein the first plane and the second plane are separated by an angle that is greater than 0 degrees, and
wherein the one or more other surfaces include:
a third surface,
wherein corresponding edges of the first and second surfaces are joined together, corresponding edges of the first and third surfaces are joined together, and corresponding edges of the second and third surfaces are joined together such that the first, second and third surfaces form a triangle.

5. The retention device of claim 1, wherein the retention device is made from plastic or metal.

6. The retention device of claim 1, wherein the shape of each protrusion in the first set of protrusions permits that protrusion to insert into the floor, and wherein the shape of each protrusion in the second set of protrusions permits that protrusion to insert into the article.

7. The retention device of claim 1, wherein each protrusion in the first set of protrusions has a pointed tip, and wherein each protrusion in the second set of protrusions has a pointed tip.

8. The retention device of claim 7, wherein the first set of protrusions includes at least 3 protrusions, and wherein the second set of protrusions includes at least 3 protrusions.

9. The retention device of claim 8, wherein all protrusions extending outward from the first surface form a first row of protrusions, and wherein all protrusions extending outward from the second surface form a second row of protrusions.

10. The retention device of claim 9, wherein each protrusion in the first set of protrusions has a height that is less than one-fourth of a width of the first surface and less than one-fourth a length of the first surface.

11. The retention device of claim 1, wherein the angle is greater than or equal to 90 degrees and less than or equal to 135 degrees.

12. The retention device of claim 1, wherein the retention device is rigid such that the first surface and the second surface do not move relative each other.

13. The retention device of claim 1, wherein dimensions of the first surface and dimensions of the second surface are equal, and wherein a surface area of the first surface and a surface area of the second surface are equal.

14. The retention device of claim 1, wherein corresponding edges of the third and sixth surfaces are joined together, corresponding edges of the fourth and sixth surfaces are joined together, corresponding edges of the third and eighth surfaces are joined together, and corresponding edges of the fourth and eighth surfaces are joined together.

15. The retention device of claim 1, wherein the fifth surface and the seventh surface do not face each other, and wherein the sixth surface and the eighth surface face each other.

16. The retention device of claim 4, wherein the one or more other surfaces include:
a fourth surface; and
a fifth surface,
wherein edges of the first, second and third surfaces are joined together with corresponding edges of the fourth surface, and
wherein other edges of the first, second and third surfaces are joined together with corresponding edges of the fifth surface.

17. The retention device of claim 16, wherein the fourth and fifth surfaces do not face each other.

18. A method of manufacturing a retention device for physically restraining undesired movement of an article during transport of the article, the method comprising:
forming a first surface extending along a first plane;
forming a first set of protrusions extending outward from the first surface, wherein each protrusion in the first set of protrusions is shaped to engage a floor of a transport vehicle, and wherein each protrusion in the first set of protrusions is integrally formed with the first surface;
forming a second surface extending along a second plane;
forming a second set of protrusions extending outward from the second surface, wherein each protrusion in the second set of protrusions is shaped to engage an article positioned in the transport vehicle, and wherein each protrusion in the second set of protrusions is integrally formed with the second surface,
wherein the first plane and the second plane are separated by an angle that is greater than 0 degrees;
forming a third surface extending parallel to the first plane;
forming a fourth surface extending parallel to the second plane;
forming a fifth surface;
forming a sixth surface;
forming a seventh surface; and
forming an eighth surface,
wherein corresponding edges of the first and second surfaces are joined together, corresponding edges of the first and fifth surfaces are joined together, corresponding edges of the second and fifth surfaces are joined together, corresponding edges of the first and seventh surfaces are joined together, and corresponding edges of the second and seventh surfaces are joined together.

* * * * *